US00RE41854E

(19) United States
(12) Reissued Patent
Rashid

(10) Patent Number: US RE41,854 E
(45) Date of Reissued Patent: Oct. 26, 2010

(54) GARBAGE CAN

(75) Inventor: Karim Rashid, New York, NY (US)

(73) Assignee: Umbra U.S.A., Inc., Buffalo, NY (US)

(21) Appl. No.: 29/131,014

(22) Filed: Oct. 13, 2000

Related U.S. Patent Documents

Reissue of:
(64) Patent No.: Des. 399,622
Issued: Oct. 13, 1998
Appl. No.: 29/070,881
Filed: Apr. 23, 1997

(30) Foreign Application Priority Data

Apr. 17, 2000 (JP) ..... 2000-9984

(51) LOC (9) Cl. ..... 09-09
(52) U.S. Cl. ..... D34/1
(58) Field of Classification Search ..... D34/1; D7/510–11, 524; D9/530, 531; D24/120; D11/143, 148, 152–154; D32/37, 53; D3/304, D3/306, 307, 308, 309, 312, 314; 604/301
See application file for complete search history.

(56) References Cited

U.S. PATENT DOCUMENTS

D38,248 S * 9/1906 Helmer ..... D7/523
D57,156 S 2/1921 Schaffer (Continued)

FOREIGN PATENT DOCUMENTS

DE 3821504 11/1989

OTHER PUBLICATIONS

Catalog Page, Wastebasket, Rubbermaid Inc., Publication Date 1991.

(Continued)

*Primary Examiner*—Robin V Webster
(74) *Attorney, Agent, or Firm*—Saidman DesignLaw Group

(57) CLAIM

The ornamental design for a garbage can, as shown and described.

DESCRIPTION

FIG. 3 is a right side view thereof, the left side view being [a mirror image thereof] *identical thereto*;

FIG. 4 is a top view thereof;

FIG. 5 is a bottom view thereof; [and,

*FIG. 7 is a perspective view of a second embodiment of my design;*

*FIG. 8 is a front view thereof, the rear view being identical thereto;*

*FIG. 9 is a right side view thereof, the left side view being identical thereto;*

*FIG. 10 is a perspective view of a third embodiment of my design;*

*FIG. 11 is a front view thereof, the rear view being identical thereto, and,*

*FIG. 12 is a right side view thereof, the left side view being identical thereto.*

Figure 1:
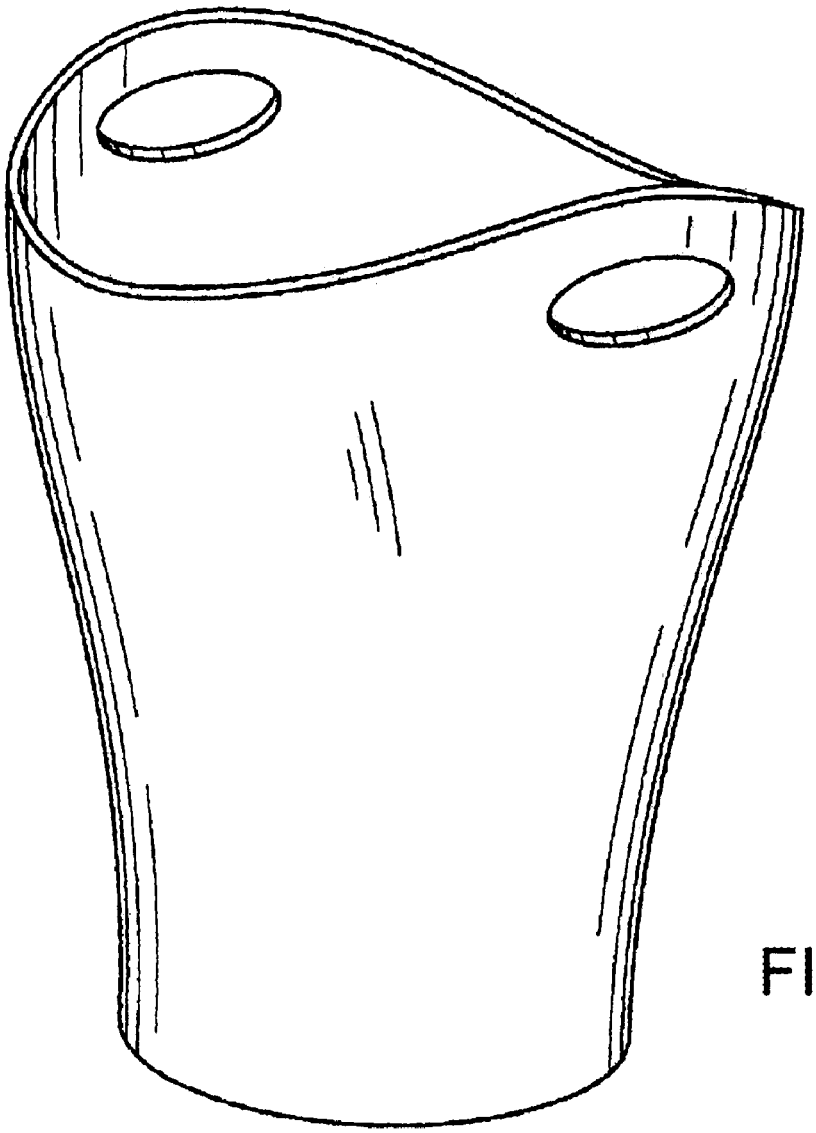
FIG. 1 is a perspective view of [a first side of] a garbage can showing [the] *my* new design.
Figure 2:
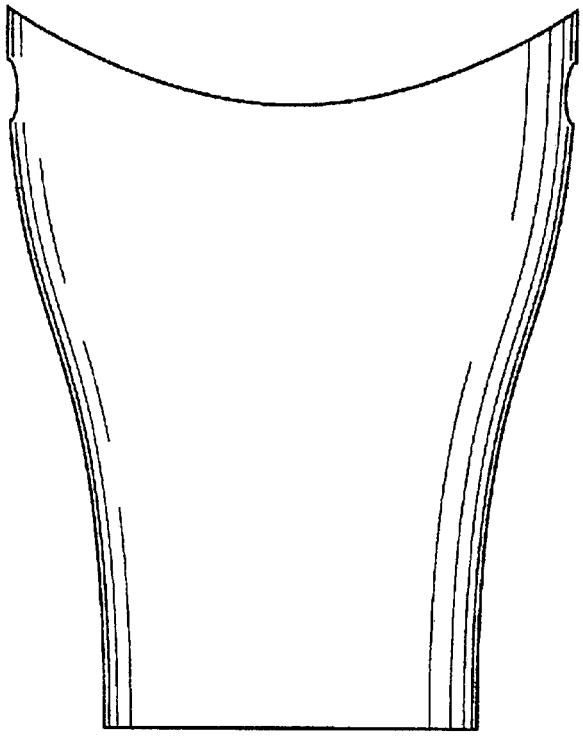
FIG. 2 is a front view thereof, the back view being [a mirror image thereof] *identical thereto*.
Figure 6:
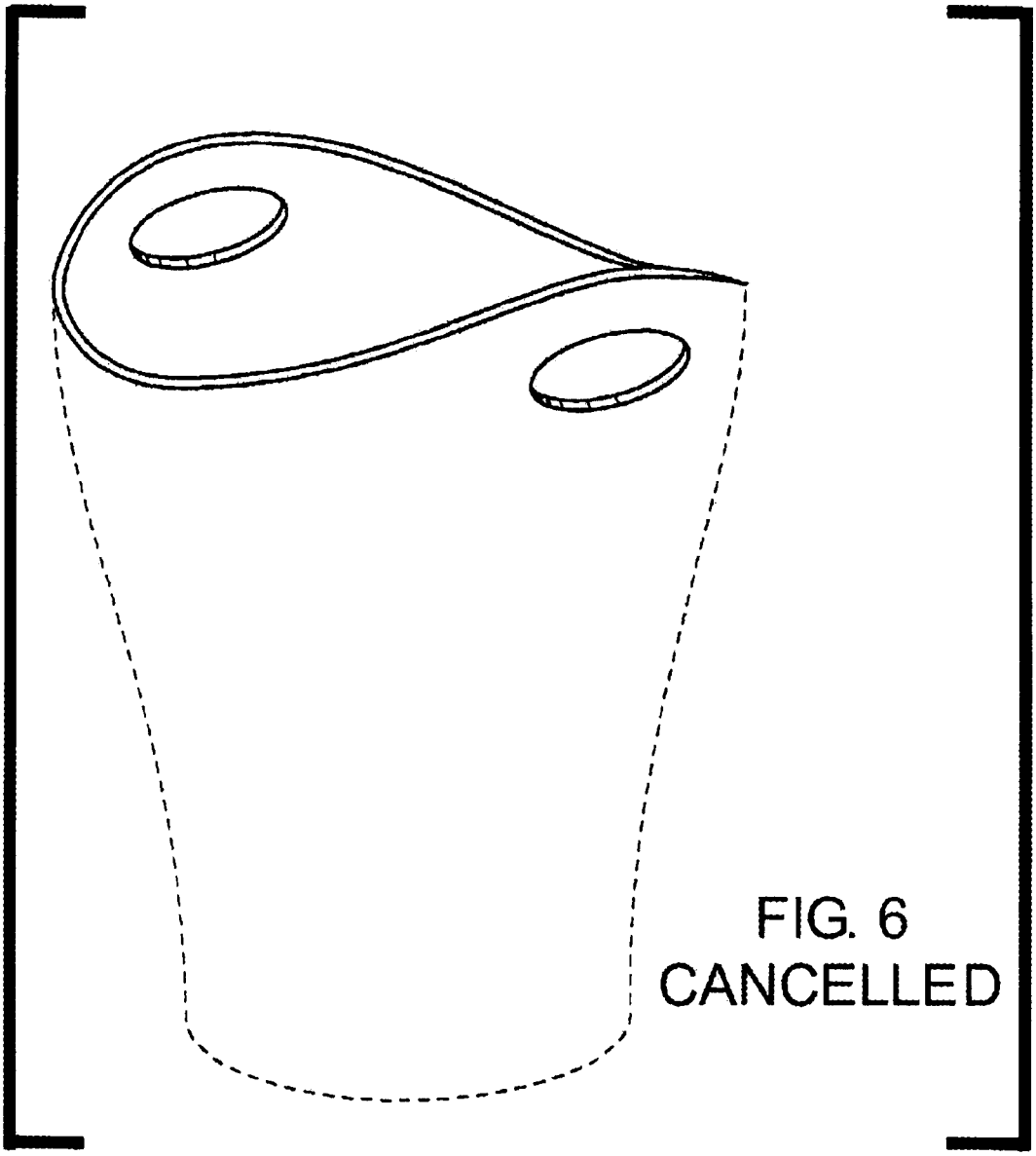
FIG. 6 is a section view along 6 —6 of FIG. 3.]

*The dashed lines illustrate portions of the garbage can that form no part of the claim in the respective embodiments.*

1 Claim, 8 Drawing Sheets

Matter enclosed in heavy brackets [ ] appears in the original patent, but forms no part of this reissue; matter printed in italics indicates the additions made by reissue.

U.S. PATENT DOCUMENTS

| | | | | | |
|---|---|---|---|---|---|
| D67,869 | S | * | 7/1925 | Boswell | D7/523 |
| 1,724,621 | A | * | 8/1929 | Sacks | D24/120 |
| D115,493 | S | | 7/1939 | Fuerst | |
| D127,309 | S | | 5/1941 | Schmitz | |
| D205,144 | S | | 6/1966 | O'Neil | |
| 3,363,820 | A | | 1/1968 | Schilling | |
| 3,371,695 | A | | 3/1968 | Lamb | |
| D228,220 | S | | 8/1973 | Achenbach | |
| D285,515 | S | | 9/1986 | Papciak | |
| D299,625 | S | | 1/1989 | Durand | |
| 5,071,060 | A | | 12/1991 | DeFelice | |
| D328,101 | S | | 7/1992 | Rorke | |
| D329,170 | S | | 9/1992 | Hoffer | |
| D337,181 | S | * | 7/1993 | Warman | D34/1 |
| D348,755 | S | * | 7/1994 | Perry | D32/53 |
| D353,924 | S | * | 12/1994 | Markovitz | D34/1 |
| 5,382,243 | A | | 1/1995 | Mulholland | |
| D361,185 | S | * | 8/1995 | Seiler et al. | D34/1 |
| D362,525 | S | | 9/1995 | Kruger | |
| D370,344 | S | * | 6/1996 | Kim | D3/312 |
| 5,598,942 | A | | 2/1997 | Cowie | |
| D381,159 | S | | 7/1997 | Hampton | |
| D387,531 | S | | 12/1997 | Tisbo et al. | |
| D389,621 | S | | 1/1998 | Short et al. | |

OTHER PUBLICATIONS

Price List, Wastebasket , Frem Corp., Publications Date May 1, 1991.

Catalog p.8, Wastbaskets, Rubbermaid Japan Inc., Published At Least As Early As Apr. 1995.

Ebert Catalog p. 27, Utility Vase, Publication Date Aug. 1995.

Catalog Page, Wastebaskets, Sterilite Corp., Published At Least As Early As 1997.

Catalog Page, Wastebaskets, Sterilite Corp., Published At Least As Early as 1997.

Catalog Page, Wastebaskets, Sterilite Corp., Published At Least As Early As 1997.

Catalog Page, Wastebaskets, Rubbermaid Inc., Publication Date 1998.

* cited by examiner

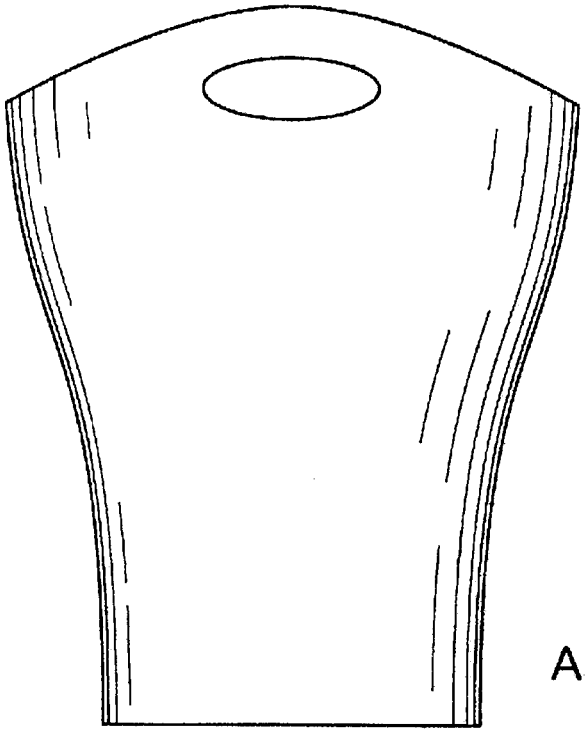
FIG. 3
AMENDED

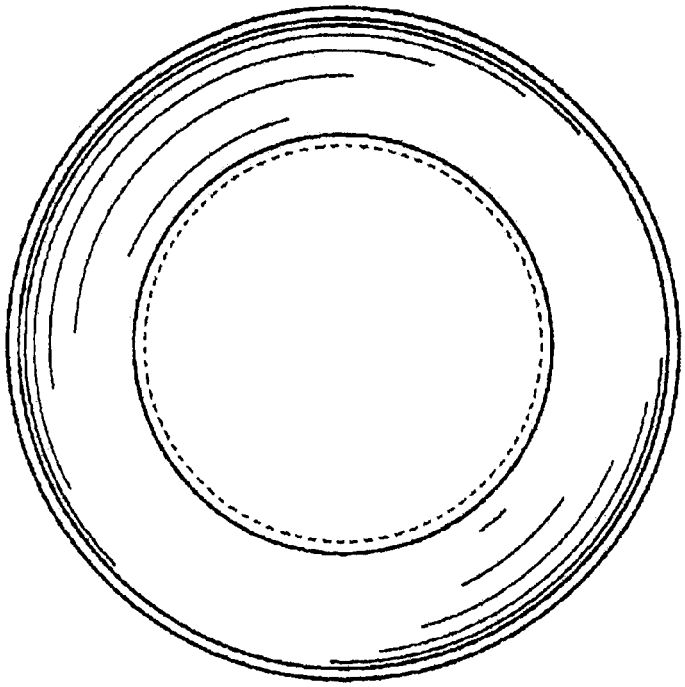
FIG. 4
AMENDED
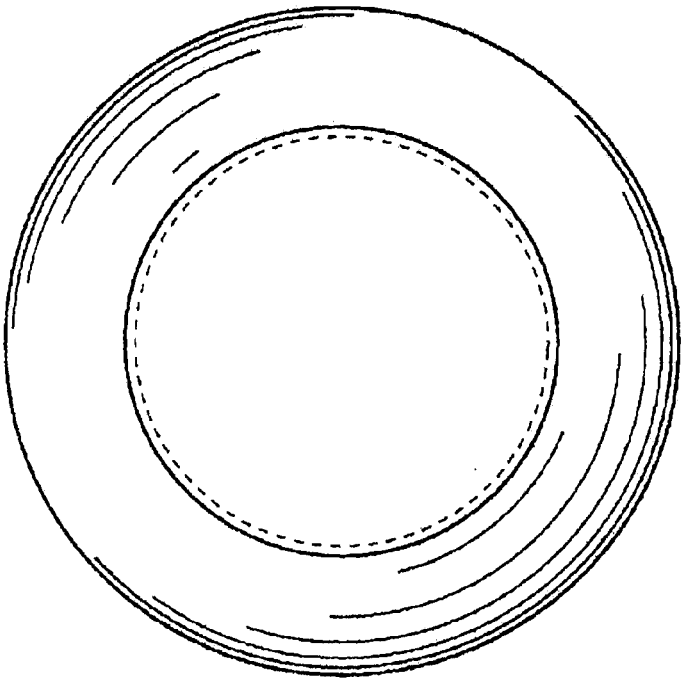
FIG. 5
AMENDED

CANCELLED

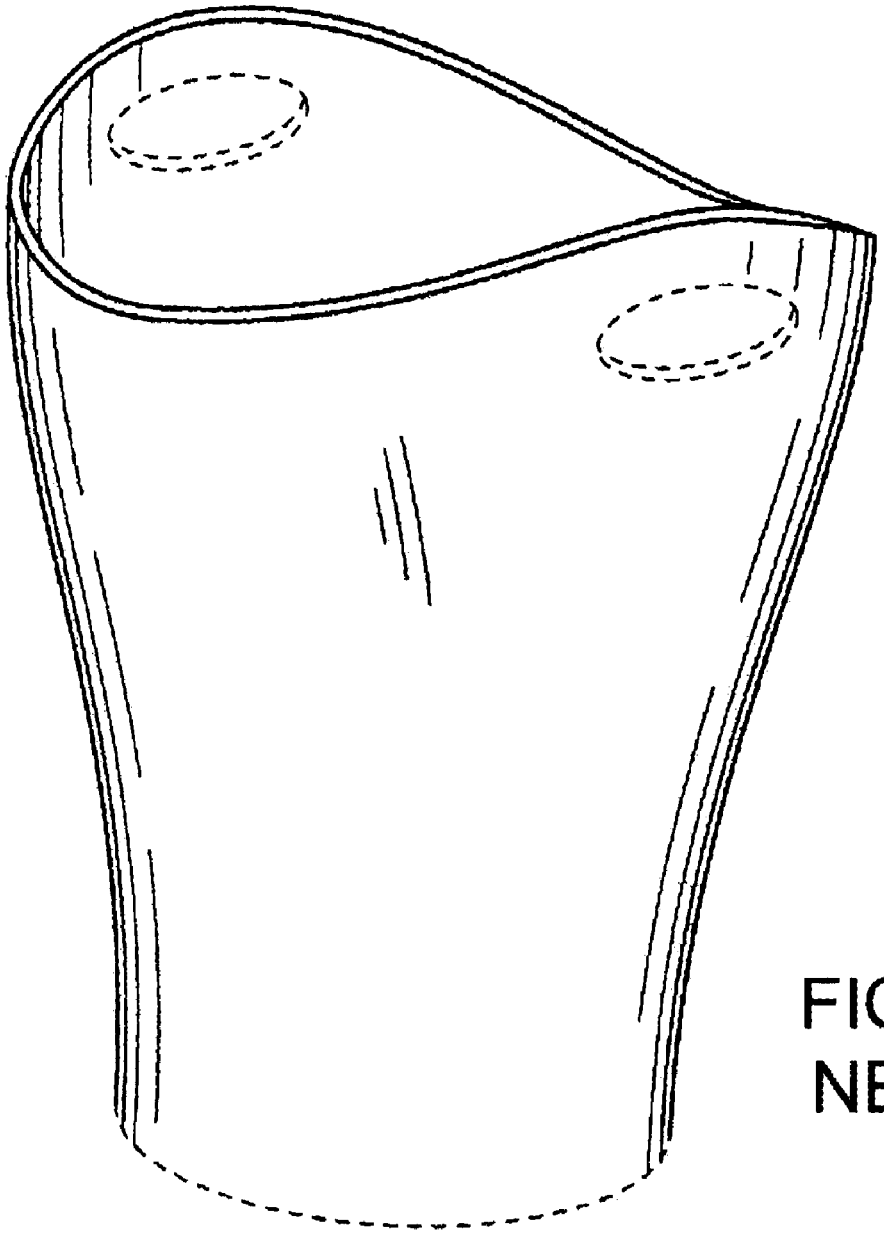
FIG. 7
NEW

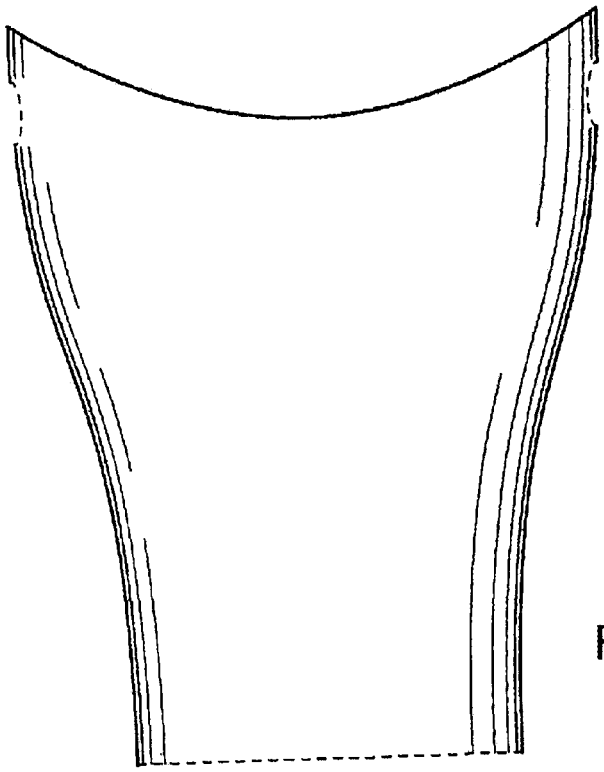
FIG. 8
NEW
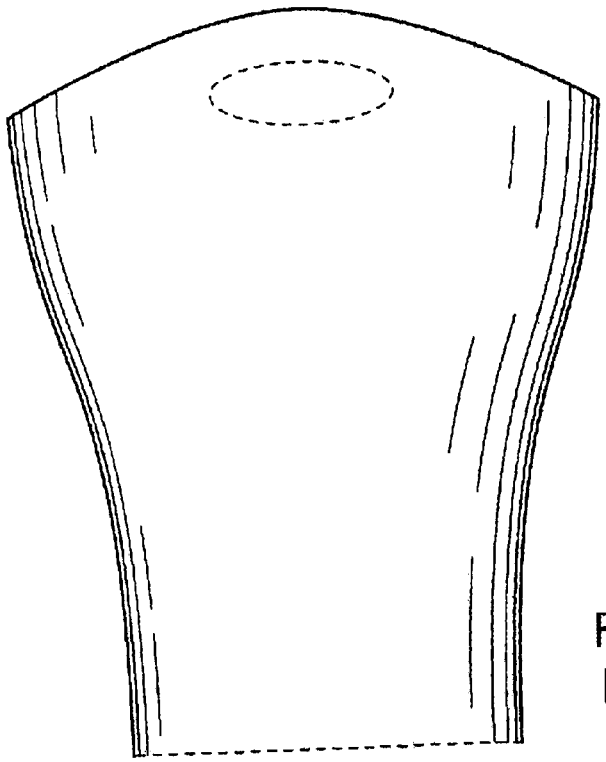
FIG. 9
NEW

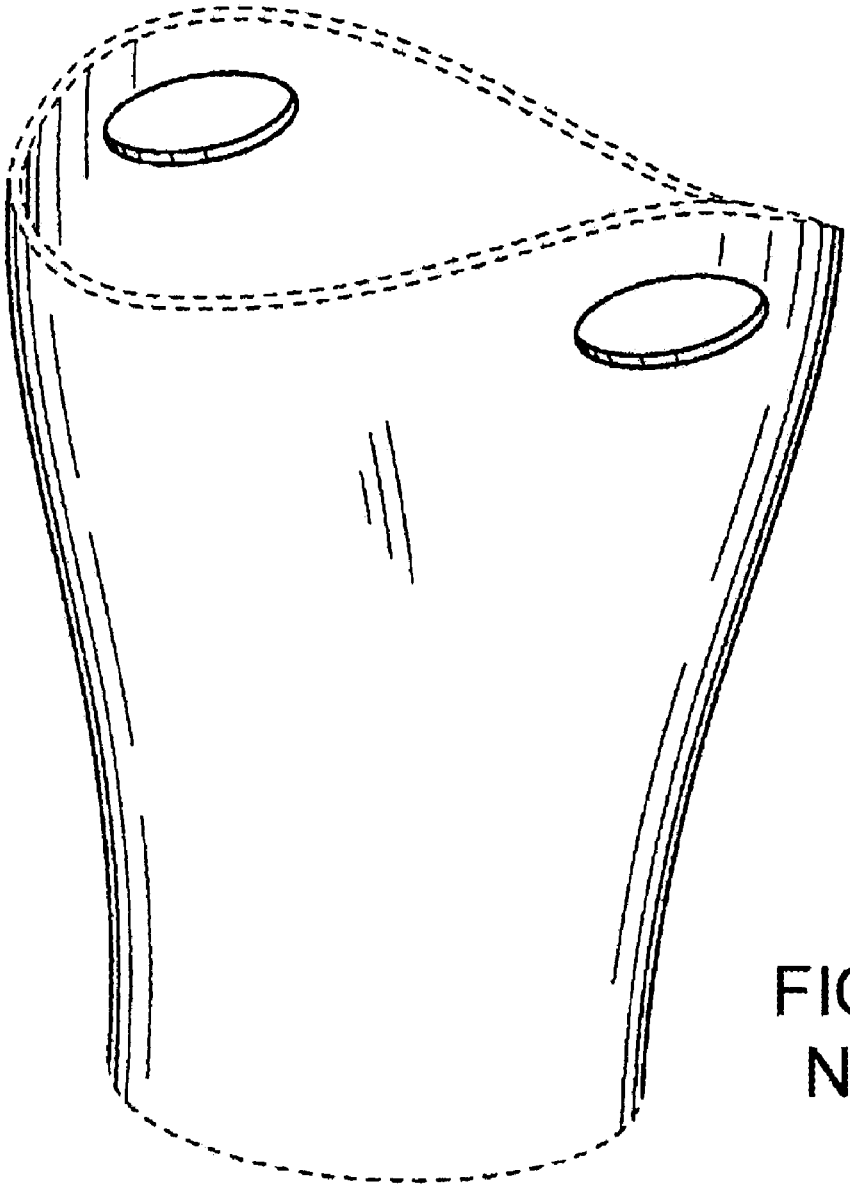
FIG. 10
NEW

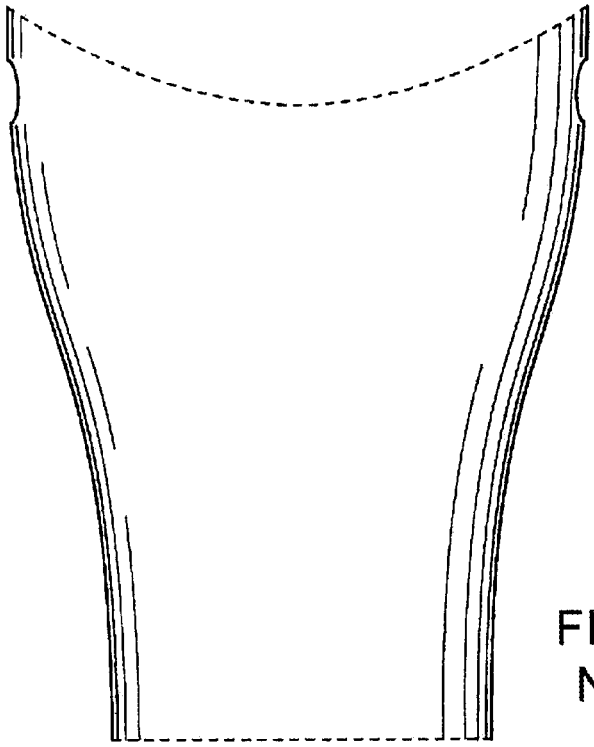
FIG. 11
NEW
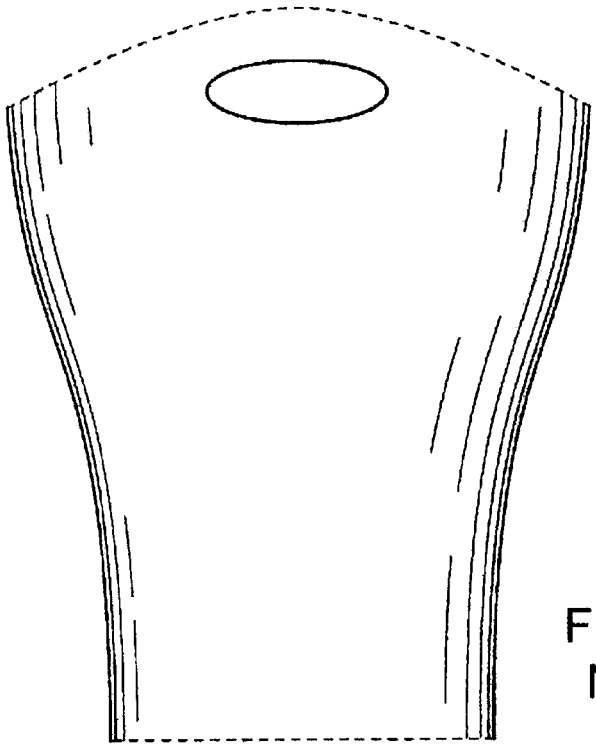
FIG. 12
NEW